Patented Apr. 9, 1940

2,196,734

UNITED STATES PATENT OFFICE 2,196,734

COLORED PHOTOGRAPHIC IMAGE FROM HYDRAZINE COMPOUNDS

Anthony Marriage, Harrow, England, assignor to Eastman Kodak Company, Rochester, N. Y., a corporation of New Jersey No Drawing. Application July 16, 1938, Serial No. 219,629. In Great Britain July 26, 1937

5 Claims. (Cl. 95—88)

The present invention relates to photography in colors and more particularly to the development of silver salt images to produce dye images.

Colored photographic images formed by development of silver halide emulsions with p-phenylene diamine or p-aminophenol developers and suitable coupler compounds are dyes of the indophenol or azo methine type. These dyes are rapidly and completely bleached by strong acid solutions and are sometimes undesirable for this reason.

It is an object of the present invention to produce acid-stable dyes for photographic images by color development. A further object is to produce colored photographic images having various light-absorption properties. Other objects will appear from the following description of my invention.

According to the present invention compounds which can be readily oxidized to quinonoid compounds are caused to react, in the presence of silver salt images, with reagents capable of reacting with a carbonyl grouping, such as compounds of the hydrazine type, to produce dye images. Thus I have found that a mixture of phenyl hydrazine and 1,2 dihydroxy naphthalene with sodium carbonate solution develops a re-halogenized silver image, producing a magenta-colored dye. The dye is formed presumably by the oxidization of the dihydroxynaphthalene to β-naphthoquinone, and subsequent reaction of this compound with the hydrazine to form a bis-azo or azo-hydrazo dye.

Dye images of this type are also formed with other organic hydrazines, both aromatic and heterocyclic, such as m-nitrophenylhydrazine, p-nitrophenylhydrazine, p-bromophenylhydrazine, 2,4-dinitrophenylhydrazine, 2,5-dichlorophenylhydrazine, 2-quinolylhydrazine, 2-naphthylhydrazine, 1-benzothiazylhydrazine and 4,4'-dihydrazinophenyl.

The optimum conditions for dye formation, such as concentration of the ingredients of the developer, alkalinity, etc. are different for each hydrazine. The nitro-substituted hydrazines give orange-red dyes, while the naphthylhydrazine and dihydrazinodiphenyl give dyes of bluish magenta shades. The colors vary somewhat with the emulsion used, being in general less bluish with a fine-grain material, such as motion picture positive film and more bluish with a rehalogenized silver bromide image on commercial film.

Various hydroxy naphthalenes which act as photographic developers may be used, such as 1,2 dihydroxynaphthalene, 1,4 dihydroxynaphthalene and 2,3 dichloro, 1,4-dihydroxynaphthalene. I prefer to use 1,2 dihydroxynaphthalene since this compound produces dyes of desirable absorption properties with the various hydrazine compounds.

The dyes obtained were tested to determine their stability under various conditions. They were found to be quite resistant to acid, while the indophenol and azo methine dyes are rapidly and completely bleached by strong acid solutions. The dyes produced from the hydroxy compounds show a stability to light slightly higher than the indophenol and azo methine dyes and their resistance to heat and humidity is at least as great as that of these dyes.

I have found that the alkaline mixtures of dihydroxynaphthalene and hydrazine compounds used according to my invention are ordinarily not selective with respect to exposed and unexposed silver halide. They develop exposed as well as unexposed silver halide and, therefore, they can be used only on reversed or re-halogenized images. Hydrazine developers may be used in a process such as described in Mannes and Godowsky U. S. Patent No. 2,113,329, granted April 5, 1938, to develop images in any of the layers, if suitable colors are produced. The process described in the Mannes and Godowsky patent is a reversal process and all of the silver salt is developed at each color development step. If a color developer of the hydrazine type is used at any stage before the final color development, that is, the color development of the top layer, it is necessary to use a suitable bleach bath to de-colorize the dye in the upper layer or two upper layers. Hydrazine type developers may also be used in a process, such as that described in Mannes, Godowsky and Wilder U. S. application, Serial No. 185,700, filed January 19, 1938. In this process, in which the images in the various layers are developed selectively, the hydrazine developer can be used only for the final development step, whether this final development is of the top layer, middle layer, or bottom layer, since prior to the final development step one or more of the layers contains a developable silver salt.

It is to be understood that my invention is limited only by the scope of the appended claims.

What I claim is:

1. The method of forming a colored photographic image, which comprises developing an exposed silver halide image in an alkaline solution of 1:2 or 1:4 dihydroxynaphthalene and an organic derivative of hydrazine.

2. The method of forming a colored photographic image, which comprises developing a reversed silver halide image in an alkaline solution of 1:2 or 1:4-dihydroxynaphthalene and an organic derivative of hydrazine.

3. The method of forming a colored photographic image, which comprises developing a reversed silver halide image in an alkaline solution of 1:2-dihydroxynaphthalene and an aromatic hydrazine.

4. The method of forming a colored photographic image, which comprises developing a reversed silver halide image in an alkaline solution of 1:2-dihydroxynaphthalene and a heterocyclic derivative of hydrazine.

5. The method of forming a colored photographic image, which comprises developing a reversed silver halide image in an alkaline solution of 1:2-dihydroxynaphthalene and phenyl hydrazine.

ANTHONY MARRIAGE.